United States Patent
Su et al.

(10) Patent No.: US 12,426,010 B2
(45) Date of Patent: Sep. 23, 2025

(54) RESOURCE CONFIGURATION METHOD FOR SIDELINK INFORMATION, COMMUNICATION DEVICE, AND NETWORK DEVICE

(71) Applicant: Huawei Technologies Co., Ltd., Shenzhen (CN)

(72) Inventors: Hongjia Su, Shanghai (CN); Jinfang Zhang, Shenzhen (CN); Zhengzheng Xiang, Shanghai (CN); Lei Lu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 545 days.

(21) Appl. No.: 17/168,748

(22) Filed: Feb. 5, 2021

(65) Prior Publication Data
US 2021/0168764 A1    Jun. 3, 2021

Related U.S. Application Data

(63) Continuation of application No. PCT/CN2019/092146, filed on Jun. 20, 2019.

(30) Foreign Application Priority Data

Aug. 7, 2018 (CN) .................... 201810892331.9

(51) Int. Cl.
*H04W 72/02* (2009.01)
*H04L 5/00* (2006.01)
(Continued)

(52) U.S. Cl.
CPC ........... *H04W 72/02* (2013.01); *H04L 5/0055* (2013.01); *H04W 52/52* (2013.01); *H04W 72/0446* (2013.01); *H04W 72/20* (2023.01)

(58) Field of Classification Search
CPC .... H04L 5/0055; H04W 52/52; H04W 72/02; H04W 72/20; H04W 72/0446
See application file for complete search history.

(56) References Cited

U.S. PATENT DOCUMENTS 10,356,803 B2   7/2019   Kim et al.
10,986,610 B2   4/2021   Kim et al.
(Continued)

FOREIGN PATENT DOCUMENTS

CN    105451211 A    3/2016
CN    106688295 A    5/2017
(Continued)

OTHER PUBLICATIONS

"3rd Generation Partnership Project; Technical Specification Group Radio Access Network; NR; Physical channels and modulation (Release 15)," 3GPP TS 38.211 V15.2.0, Jun. 2018, 93 pages.
(Continued)

*Primary Examiner* — Elton Williams
(74) *Attorney, Agent, or Firm* — SLATER MATSIL, LLP

(57) ABSTRACT

A resource configuration method for sidelink information, a communication device, a network device, and a system the method including receiving first indication information from a network device, where the first indication information indicates a first, second, and third resource in one slot, where the first resource is used for transmitting uplink information, the second resource is used for transmitting downlink information, and the third resource is used for transmitting first information or not transmitting information, the first information comprising uplink information, downlink information, or sidelink information, receiving second indication information from the network device, the second indication information indicating a fourth resource belonging to the first resource, and being used for transmitting sidelink information to a second communication device, and sending (Continued)

First resource
 Second resource
 Third resource
 Fourth resource a sidelink information to the second communication device on the fourth resource, the sidelink information including sidelink feedback information.

14 Claims, 4 Drawing Sheets

(51) Int. Cl.
*H04W 52/52* (2009.01)
*H04W 72/0446* (2023.01)
*H04W 72/20* (2023.01)

(56) References Cited

U.S. PATENT DOCUMENTS

| | | |
|---|---|---|
| 2017/0230959 A1 | 8/2017 | Wu et al. |
| 2017/0359835 A1 | 12/2017 | Seo et al. |
| 2018/0035278 A1 | 2/2018 | Aminaka et al. |
| 2018/0049217 A1 | 2/2018 | Dinan et al. |
| 2018/0098268 A1 | 4/2018 | Agiwal et al. |
| 2018/0115873 A1 | 4/2018 | Aminaka |
| 2018/0139668 A1 | 5/2018 | Takahashi et al. |
| 2019/0306923 A1* | 10/2019 | Xiong ............... H04J 13/0062 |
| 2020/0029318 A1* | 1/2020 | Guo .................. H04L 1/1822 |
| 2020/0137806 A1 | 4/2020 | Islam et al. |

FOREIGN PATENT DOCUMENTS

| | | | |
|---|---|---|---|
| CN | 107466483 A | 12/2017 | |
| CN | 107592327 A | 1/2018 | |
| CN | 108307517 A | 7/2018 | |
| EP | 3179811 A1 | 6/2017 | |
| JP | 2017168874 A | 9/2017 | |
| WO | 2016135790 A1 | 9/2016 | |
| WO | WO-2017171398 A1 * | 10/2017 | ......... H04L 27/2607 |
| WO | 2018074874 A1 | 4/2018 | |
| WO | 2018124776 A1 | 7/2018 | |

OTHER PUBLICATIONS

"3rd Generation Partnership Project; Technical Specification Group Radio Access Network; NR; Multiplexing and channel coding (Release 15)," 3GPP TS 38.212 V15.2.0, Jun. 2018, 94 pages.
"3rd Generation Partnership Project; Technical Specification Group Radio Access Network; NR; Physical layer procedures for control (Release 15)," 3GPP TS 38.213 V15.2.0, Jun. 2018, 98 pages.
"3rd Generation Partnership Project; Technical Specification Group Radio Access Network; NR; Physical layer procedures for data (Release 15)," 3GPP TS 38.214 V15.2.0, Jun. 2018, 95 pages.
"3rd Generation Partnership Project; Technical Specification Group Radio Access Network; NR; Radio Resource Control (RRC) protocol specification (Release 15)," 3GPP TS 38.331 V15.2.1, Jun. 2018, 303 pages.
"Discussion on Semi-Static TDD Configurations," Source: CMCC, Agenda Item: 8.1.8, Document for: Discussion and Decision, 3GPP TSG RAN WG1 Meeting #88, R1-1703410, Athens, Greece Feb. 13-17, 2017, 4 pages.
"Resource Allocation for NR Uplink Control Channel," Source: Intel Corporation, Agenda item: 5.1.3.2, Document for: Discussion and Decision, 3GPP TSG RAN WG1 NR Ad-Hoc Meeting, R1-1700369, Spokane, USA, Jan. 16-20, 2017, 4 pages.
"Resource Allocation for NR Uplink Control Channel," Source: Intel Corporation, Agenda item: 8.1.3.2.3, Document for: Discussion and Decision, 3GPP TSG RAN WG1 Meeting #88, R1-1702230, Athens, Greece, Feb. 13-17, 2017, 3 pages.
"NR Group Common PDCCH," Source: Intel Corporation, Agenda Item: 8.1.3.1.3, Document for: Discussion and Decision, 3GPP TSG RAN WG1 #88bis, R1-1704745, Spokane, USA, Apr. 3-7, 2017, 4 pages.
"Discussion on DL/UL Transmission Direction," Source; Panasonic, Agenda Item: 7.1.3.1.5, Document for: Discussion, Decision, 3GPP TSG RAN WG1 Meeting Meeting #89, R1-1708112, Hangzhou, P.R. China, May 15-19, 2017, 4 pages.
"Discussion on 64QAM Support," Agenda Item: 5.2.3.2, Source; LG Electronics, Document for: Discussion, 3GPP TSG RAN WG1 Meeting #90, R1-1713089, Prague, Czechia, Aug. 21-25, 2017, 3 pages.
"Frame and Slot Structure for Sidelink," Agenda Item: 7.2.4.1.5, Source: Huawei, HiSilicon, Document for: Discussion and Decision, 3GPP TSG RAN WG1 Meeting #95, R1-1813552, Spokane, USA, Nov. 12-16, 2018, 4 pages.
"Frame and Slot Structure for Sidelink," Agenda Item: 7.2.4.8, Source: Huawei, HiSilicon, Document for: Discussion and Decision, 3GPP TSG RAN WG1 Meeting #97, R1-1906594, Reno, USA, May 13-17, 2019, 5 pages.
"Synchronization Signal Design in NR," Agenda Item: 8.1.5.1, Source: Huawei, HiSilicon, Document for: Discussion and Decision, 3GPP TSG RAN WG1 Meeting #86bis, R1-1608846, Lisbon, Portugal, Oct. 10-14, 2016, 5 pages.
"Group-Common PDCCH: Contents," Source: Intel Corporation, Agenda Item: 7.1.3.1.5, Document for: Discussion and Decision, 3GPP TSG RAN WG1 #89, R1-1707385, Hangzhou, P.R. China, May 15-19, 2017, 4 pages.
"Considerations on HARQ-ACK Feedback for NR-V2X Unicast," Agenda Item: 7.2.4.1.5, Source: Fujitsu, Document for: Discussion/ Decision, 3GPP TSG RAN WG1 Meeting #95, R1-1812411, Spokane, USA, Nov. 12-16, 2018, 5 pages.
ITRI, R1-1719683, "Discussion on Short TTI for V2X Phase 2," 3GPP TSG RAN WG1 #91, 3GPP (Nov. 27, 2017-Dec. 1, 2017), 4 pages.
LG Electronics, R1-164537, "Discussion on UE feedback for DL multicast/broadcast," 3GPP TSG RAN WG1 #85, 3GPP (May 23-27, 2016), 5 pages.
OPPO: "Latency reduction for eV2X," 3GPP TSG RAN WG1 Meeting #92bis, Sanya, China, Apr. 16-20, 2018, R1-1803987, total 4 pages.

* cited by examiner

RESOURCE CONFIGURATION METHOD FOR SIDELINK INFORMATION, COMMUNICATION DEVICE, AND NETWORK DEVICE

CROSS-REFERENCE TO RELATED APPLICATIONS

This application is a continuation of International Application No. PCT/CN2019/092146, filed on Jun. 20, 2019, which claims priority to Chinese Patent Application No. 201810892331.9, filed on Aug. 7, 2018. The disclosures of the aforementioned applications are hereby incorporated by reference in their entireties.

TECHNICAL FIELD

Embodiments of this application relate to a communications system, and in particular, to a resource configuration method for sidelink information, a communication device, and a network device.

BACKGROUND

Device-to-device (D2D) communication, vehicle-to-vehicle (V2V) communication, vehicle-to-pedestrian (V2P) communication, or vehicle-to-infrastructure/network (V2I/N) communication is a technology for direct communication between terminal devices. Direct transmission between terminal devices is defined as sidelink (SL) transmission. V2V, V2P, and V2I/N are collectively referred to as V2X (vehicle-to-everything), that is, vehicle communication with everything.

For example, in V2X communication, a terminal device may perform communication of control information and data with another terminal device on a resource allocated by an access network device. In existing V2X communication, the access network device configures an uplink resource, a downlink resource, and a flexible resource for the terminal device, and does not configure a sidelink resource for the terminal device for transmitting sidelink information between terminal devices.

SUMMARY

Embodiments of this application provide a resource configuration method for sidelink information, a communication device, a network device, and a system, to configure a resource for transmitting sidelink information between terminal devices.

According to a first aspect, a resource configuration method for sidelink information is provided. The method may be performed by a network device or a chip in a network device. The method includes sending, by the network device, first indication information to a first communication device, where the first indication information indicates a first resource, a second resource, and a third resource, the first resource is used for transmitting uplink information, the second resource is used for transmitting downlink information, and the third resource may be used for transmitting first information or not transmit information, where the first information includes at least one of uplink information, downlink information, or sidelink information, and sending, by the network device, second indication information to the first communication device, where the second indication information indicates a fourth resource, the fourth resource belongs to the first resource, the third resource, or the first resource and the third resource, and the fourth resource is used for transmitting sidelink information between the first communication device and a second communication device.

According to this embodiment of this application, the network device configures the first resource, the second resource, and the third resource for the first communication device, and configures the fourth resource for the first communication device on the first resource, the third resource, or the first resource and the third resource, so that the first communication device can transmit sidelink information to the second communication device on the fourth resource.

In a possible design, the second indication information is further used to indicate a fifth resource, the fifth resource belongs to the third resource, and the fifth resource is used for transmitting at least one of uplink information and downlink information. In this way, an uplink resource and a downlink resource may be reconfigured.

In a possible design, before the sending, by the network device, second indication information to the first communication device, the method further includes sending, by the network device, third indication information to the first communication device, where the third indication information indicates a fifth resource, the fifth resource belongs to the third resource, and the fifth resource is used for transmitting at least one of uplink information and downlink information. In this way, an uplink resource and a downlink resource may be reconfigured.

In a possible design, the network device sends fourth indication information to the first communication device, where the fourth indication information indicates a sidelink slot format indicator radio network temporary identifier, and the network device scrambles, by using the sidelink slot format indicator radio network temporary identifier, the first indication information, the second indication information, and the third indication information. In this way, only the first communication device can obtain the first indication information, the second indication information, and the third indication information.

In a possible design, the second indication information includes at least one of slot location information, mini-slot location information, start symbol location information, a quantity of occupied symbols, a quantity of occupied mini-slots, and a quantity of occupied slots that are of the fourth resource. In this way, the fourth resource may be configured.

According to a second aspect, a resource configuration method for sidelink information is provided. The method may be performed by a first communication device or a chip in a first communication device. The method includes receiving, by the first communication device, first indication information from a network device, where the first indication information indicates a first resource, a second resource, and a third resource, the first resource is used for transmitting uplink information, the second resource is used for transmitting downlink information, and the third resource may be used for transmitting first information or not transmit information, where the first information includes at least one of uplink information, downlink information, or sidelink information, receiving, by the first communication device, second indication information from the network device, where the second indication information indicates a fourth resource, the fourth resource belongs to the first resource, the third resource, or the first resource and the third resource, and the fourth resource is used for transmitting sidelink information between the first communication device and a second communication device, and sending, by the first communication device, the sidelink information to the second communication device on the fourth resource.

According to this embodiment of this application, the first communication device obtains the first resource, the second resource, the third resource, and the fourth resource, and transmits the sidelink information to the second communication device on the fourth resource.

In a possible design, the second indication information is further used to indicate a fifth resource, the fifth resource belongs to the third resource, and the fifth resource is used for transmitting at least one of uplink information and downlink information. In this way, an uplink resource and a downlink resource may be reconfigured.

In a possible design, before the receiving, by the first communication device, second indication information from the network device, the method further includes receiving, by the first communication device, third indication information from the network device, where the third indication information indicates a fifth resource, the fifth resource belongs to the third resource, and the fifth resource is used for transmitting at least one of uplink information and downlink information. In this way, an uplink resource and a downlink resource may be reconfigured.

In a possible design, the first communication device receives fourth indication information from the network device, where the fourth indication information indicates a sidelink slot format indicator radio network temporary identifier, and the first communication device descrambles, by using the sidelink slot format indicator radio network temporary identifier, the first indication information, the second indication information, and the third indication information. In this way, only the first communication device can obtain the first indication information, the second indication information, and the third indication information.

In a possible design, the second indication information includes at least one of slot location information, mini-slot location information, start symbol location information, a quantity of occupied symbols, a quantity of occupied mini-slots, and a quantity of occupied slots that are of the fourth resource. In this way, the fourth resource may be configured.

In a possible design, the sidelink information includes at least one of sidelink control information or sidelink data, and the first communication device sends the sidelink data to the second communication device on the fourth resource based on the sidelink control information. In this way, the first communication device can send the sidelink information to the second communication device.

In a possible design, the sidelink information further includes sidelink feedback information, where the sidelink feedback information indicates whether the second communication device correctly receives the sidelink data, and the first communication device receives the sidelink feedback information from the second communication device on the fourth resource. In this way, the first communication device can receive the sidelink feedback information from the second communication device.

According to a third aspect, a resource configuration method for sidelink information is provided. The method may be performed by a second communication device or a chip in a second communication device. The method includes receiving, by the second communication device, first indication information from a network device, where the first indication information indicates a first resource, a second resource, and a third resource, the first resource is used for transmitting uplink information, the second resource is used for transmitting downlink information, and the third resource may be used for transmitting first information or not transmit information, where the first information includes at least one of uplink information, downlink information, or sidelink information, receiving, by the second communication device, second indication information from the network device, where the second indication information indicates a fourth resource, the fourth resource belongs to the first resource, the third resource, or the first resource and the third resource, and the fourth resource is used for transmitting sidelink information between the second communication device and a first communication device, and receiving, by the second communication device, the sidelink information from the first communication device on the fourth resource.

According to this embodiment of this application, the second communication device obtains the first resource, the second resource, the third resource, and the fourth resource, and transmits the sidelink information to the first communication device on the fourth resource.

In a possible design, the second indication information is further used to indicate a fifth resource, the fifth resource belongs to the third resource, and the fifth resource is used for transmitting at least one of uplink information and downlink information. In this way, an uplink resource and a downlink resource may be reconfigured.

In a possible design, before the second communication device receives the second indication information from the network device, the second communication device receives third indication information from the network device, where the third indication information indicates a fifth resource, the fifth resource belongs to the third resource, and the fifth resource is used for transmitting at least one of uplink information and downlink information. In this way, an uplink resource and a downlink resource may be reconfigured.

In a possible design, the second communication device receives fourth indication information from the network device, where the fourth indication information indicates a sidelink slot format indicator radio network temporary identifier, and the second communication device descrambles, by using the sidelink slot format indicator radio network temporary identifier, the first indication information, the second indication information, and the third indication information. In this way, only the second communication device can obtain the first indication information, the second indication information, and the third indication information.

In a possible design, the second indication information includes at least one of slot location information, mini-slot location information, start symbol location information, a quantity of occupied symbols, a quantity of occupied mini-slots, and a quantity of occupied slots that are of the fourth resource. In this way, the fourth resource may be configured.

In a possible design, the sidelink information includes at least one of sidelink control information or sidelink data, and the second communication device receives the sidelink data from the first communication device on the fourth resource based on the sidelink control information. In this way, the second communication device can receive the sidelink information from the first communication device.

In a possible design, the sidelink information further includes sidelink feedback information, where the sidelink feedback information indicates whether the second communication device correctly receives the sidelink data, and the second communication device sends the sidelink feedback information to the first communication device on the fourth resource. In this way, the second communication device can send the sidelink feedback information to the first communication device.

According to a fourth aspect, a network device is provided. The network device includes a sending unit, configured to send first indication information to a first communication device, where the first indication information indicates a first resource, a second resource, and a third resource, the first resource is used for transmitting uplink information, the second resource is used for transmitting downlink information, and the third resource may be used for transmitting first information or not transmit information, where the first information includes at least one of uplink information, downlink information, or sidelink information, and the sending unit is further configured to send second indication information to the first communication device, where the second indication information indicates a fourth resource, the fourth resource belongs to the first resource, the third resource, or the first resource and the third resource, and the fourth resource is used for transmitting sidelink information between the first communication device and a second communication device.

According to this embodiment of this application, the network device configures the first resource, the second resource, and the third resource for the first communication device, and configures the fourth resource for the first communication device on the first resource, the third resource, or the first resource and the third resource, so that the first communication device can transmit sidelink information to the second communication device on the fourth resource.

In a possible design, the second indication information is further used to indicate a fifth resource, the fifth resource belongs to the third resource, and the fifth resource is used for transmitting at least one of uplink information and downlink information. In this way, an uplink resource and a downlink resource may be reconfigured.

In a possible design, before the sending unit sends the second indication information to the first communication device, the sending unit is further configured to send third indication information to the first communication device, where the third indication information indicates a fifth resource, the fifth resource belongs to the third resource, and the fifth resource is used for transmitting at least one of uplink information and downlink information. In this way, an uplink resource and a downlink resource may be reconfigured.

In a possible design, the sending unit is further configured to send fourth indication information to the first communication device, where the fourth indication information indicates a sidelink slot format indicator radio network temporary identifier, and the network device further includes a processing unit, where the processing unit is configured to scramble, by using the sidelink slot format indicator radio network temporary identifier, the first indication information, the second indication information, and the third indication information. In this way, only the first communication device can obtain the first indication information, the second indication information, and the third indication information.

In a possible design, the second indication information includes at least one of slot location information, mini-slot location information, start symbol location information, a quantity of occupied symbols, a quantity of occupied mini-slots, and a quantity of occupied slots that are of the fourth resource. In this way, the fourth resource may be configured.

According to a fifth aspect, a first communication device is provided. The first communication device includes a receiving unit, configured to receive first indication information from a network device, where the first indication information indicates a first resource, a second resource, and a third resource, the first resource is used for transmitting uplink information, the second resource is used for transmitting downlink information, and the third resource may be used for transmitting first information or not transmit information, where the first information includes at least one of uplink information, downlink information, or sidelink information, and the receiving unit is further configured to receive second indication information from the network device, where the second indication information indicates a fourth resource, the fourth resource belongs to the first resource, the third resource, or the first resource and the third resource, and the fourth resource is used for transmitting sidelink information between the first communication device and a second communication device, and a sending unit, configured to send sidelink information to the second communication device on the fourth resource.

According to this embodiment of this application, the first communication device obtains the first resource, the second resource, the third resource, and the fourth resource, and transmits the sidelink information to the second communication device on the fourth resource.

In a possible design, the second indication information is further used to indicate a fifth resource, the fifth resource belongs to the third resource, and the fifth resource is used for transmitting at least one of uplink information and downlink information. In this way, an uplink resource and a downlink resource may be reconfigured.

In a possible design, before the receiving unit receives the second indication information from the network device, the receiving unit is further configured to receive third indication information from the network device, where the third indication information indicates a fifth resource, the fifth resource belongs to the third resource, and the fifth resource is used for transmitting at least one of uplink information and downlink information. In this way, an uplink resource and a downlink resource may be reconfigured.

In a possible design, the receiving unit is further configured to receive fourth indication information from the network device, where the fourth indication information indicates a sidelink slot format indicator radio network temporary identifier, and the first communication device further includes a processing unit, where the processing unit is configured to descramble, by using the sidelink slot format indicator radio network temporary identifier, the first indication information, the second indication information, and the third indication information. In this way, only the first communication device can obtain the first indication information, the second indication information, and the third indication information.

In a possible design, the second indication information includes at least one of slot location information, mini-slot location information, start symbol location information, a quantity of occupied symbols, a quantity of occupied mini-slots, and a quantity of occupied slots that are of the fourth resource. In this way, the fourth resource may be configured.

In a possible design, the sidelink information includes at least one of sidelink control information or sidelink data, and the sending unit sends the sidelink data to the second communication device on the fourth resource based on the sidelink control information. In this way, the first communication device can send the sidelink information to the second communication device.

In a possible design, the sidelink information further includes sidelink feedback information, where the sidelink feedback information indicates whether the second communication device correctly receives the sidelink data, and the receiving unit receives the sidelink feedback information from the second communication device on the fourth resource. In this way, the first communication device can receive the sidelink feedback information from the second communication device.

According to a sixth aspect, a second communication device is provided. The second communication device includes a receiving unit, configured to receive first indication information from a network device, where the first indication information indicates a first resource, a second resource, and a third resource, the first resource is used for transmitting uplink information, the second resource is used for transmitting downlink information, and the third resource may be used for transmitting first information or not transmit information, where the first information includes at least one of uplink information, downlink information, or sidelink information, the receiving unit is further configured to receive second indication information from the network device, where the second indication information indicates a fourth resource, the fourth resource belongs to the first resource, the third resource, or the first resource and the third resource, and the fourth resource is used for transmitting sidelink information between the second communication device and a first communication device, and the receiving unit is further configured to receive sidelink information from the first communication device on the fourth resource.

According to this embodiment of this application, the second communication device obtains the first resource, the second resource, the third resource, and the fourth resource, and transmits sidelink information to the first communication device on the fourth resource.

In a possible design, the second indication information is further used to indicate a fifth resource, the fifth resource belongs to the third resource, and the fifth resource is used for transmitting at least one of uplink information and downlink information. In this way, an uplink resource and a downlink resource may be reconfigured.

In a possible design, before the receiving unit receives the second indication information from the network device, the receiving unit is further configured to receive third indication information from the network device, where the third indication information indicates a fifth resource, the fifth resource belongs to the third resource, and the fifth resource is used for transmitting at least one of uplink information and downlink information. In this way, an uplink resource and a downlink resource may be reconfigured.

In a possible design, the receiving unit is further configured to receive fourth indication information from the network device, where the fourth indication information indicates a sidelink slot format indicator radio network temporary identifier, and the second communication device further includes a processing unit, where the processing unit is configured to descramble, by using the sidelink slot format indicator radio network temporary identifier, the first indication information, the second indication information, and the third indication information. In this way, only the second communication device can obtain the first indication information, the second indication information, and the third indication information.

In a possible design, the second indication information includes at least one of slot location information, mini-slot location information, start symbol location information, a quantity of occupied symbols, a quantity of occupied mini-slots, and a quantity of occupied slots that are of the fourth resource. In this way, the fourth resource may be configured.

In a possible design, the sidelink information includes at least one of sidelink control information or sidelink data, and the receiving unit receives the sidelink data from the first communication device on the fourth resource based on the sidelink control information. In this way, the second communication device can receive the sidelink information from the first communication device.

In a possible design, the sidelink information further includes sidelink feedback information, where the sidelink feedback information indicates whether the receiving unit correctly receives the sidelink data, and the second communication device further includes a sending unit, where the sending unit is configured to send the sidelink feedback information to the first communication device on the fourth resource. In this way, the second communication device can send the sidelink feedback information to the first communication device.

According to a seventh aspect, a resource configuration method for sidelink information is provided. The method may be performed by a network device or a chip in a network device. The method includes sending, by the network device, first indication information to a first communication device, where the first indication information indicates a first resource, a second resource, and a third resource, the first resource is used for transmitting uplink information, the second resource is used for transmitting downlink information, and the third resource may be used for transmitting first information or not transmit information, where the first information includes at least one of uplink information, downlink information, or sidelink information, sending, by the network device, first control information to the first communication device, where the first control information indicates a sixth resource, the sixth resource belongs to a seventh resource, and the seventh resource includes at least one of the first resource, the second resource, the third resource, and a fourth resource, where the fourth resource is used for transmitting sidelink information, and sending, by the network device, fifth indication information to the first communication device, where the fifth indication information indicates an eighth resource, the eighth resource belongs to the sixth resource, and the fourth resource in the eighth resource is used for transmitting sidelink information between the first communication device and a second communication device.

In a possible design, the network device sends fourth indication information to the first communication device, where the fourth indication information indicates a sidelink slot format indicator radio network temporary identifier, and the network device further includes a processing unit, where the processing unit scrambles, by using the sidelink slot format indicator radio network temporary identifier, at least one of the first indication information, the first control information, and the fifth indication information.

According to an eighth aspect, a resource configuration method for sidelink information is provided. The method may be performed by a first communication device or a chip in a first communication device. The method includes receiving, by the first communication device, first indication information from a network device, where the first indication information indicates a first resource, a second resource, and a third resource, the first resource is used for transmitting uplink information, the second resource is used for transmitting downlink information, and the third resource may be used for transmitting first information or not transmit information, where the first information includes at least one of uplink information, downlink information, or sidelink information, receiving, by the first communication device, first control information from the network device, where the first control information indicates a sixth resource, the sixth resource belongs to a seventh resource, and the seventh resource includes at least one of the first resource, the second resource, the third resource, and a fourth resource, where the fourth resource is used for transmitting sidelink information, receiving, by the first communication device, fifth indication information from the network device, where the fifth indication information indicates an eighth resource, the eighth resource belongs to the sixth resource, and the fourth resource in the eighth resource is used for transmitting sidelink information between the first communication device and a second communication device, and sending, by the first communication device, the sidelink information to the second communication device on the fourth resource in the eighth resource.

In a possible design, the first communication device receives fourth indication information from the network device, where the fourth indication information indicates a sidelink slot format indicator radio network temporary identifier, and the first communication device descrambles, by using the sidelink slot format indicator radio network temporary identifier, at least one of the first indication information, the first control information, and the fifth indication information.

In a possible design, the sidelink information includes at least one of sidelink control information or sidelink data, and the first communication device sends the sidelink data to the second communication device on the fourth resource in the eighth resource based on the sidelink control information.

In a possible design, the sidelink information further includes sidelink feedback information, where the sidelink feedback information indicates whether the second communication device correctly receives the sidelink data, and the first communication device receives the sidelink feedback information from the second communication device on the fourth resource in the eighth resource.

According to a ninth aspect, a resource configuration method for sidelink information is provided. The method may be performed by a second communication device or a chip in a second communication device. The method includes receiving, by the second communication device, first indication information from a network device, where the first indication information indicates a first resource, a second resource, and a third resource, the first resource is used for transmitting uplink information, the second resource is used for transmitting downlink information, and the third resource may be used for transmitting first information or not transmit information, where the first information includes at least one of uplink information, downlink information, or sidelink information, receiving, by the second communication device, first control information from the network device, where the first control information indicates a sixth resource, the sixth resource belongs to a seventh resource, and the seventh resource includes at least one of the first resource, the second resource, the third resource, and a fourth resource, where the fourth resource is used for transmitting sidelink information, receiving, by the second communication device, fifth indication information from the network device, where the fifth indication information indicates an eighth resource, the eighth resource belongs to the sixth resource, and the fourth resource in the eighth resource is used for transmitting sidelink information between a first communication device and the second communication device, and receiving, by the second communication device, the sidelink information from the first communication device on the fourth resource in the eighth resource.

In a possible design, the second communication device receives fourth indication information from the network device, where the fourth indication information indicates a sidelink slot format indicator radio network temporary identifier, and the second communication device descrambles, by using the sidelink slot format indicator radio network temporary identifier, at least one of the first indication information, the first control information, and the fifth indication information.

In a possible design, the sidelink information includes at least one of sidelink control information or sidelink data, and the second communication device receives the sidelink data from the first communication device on the fourth resource in the eighth resource based on the sidelink control information.

In a possible design, the sidelink information further includes sidelink feedback information, where the sidelink feedback information indicates whether the second communication device correctly receives the sidelink data, and the second communication device sends the sidelink feedback information to the first communication device on the fourth resource in the eighth resource.

According to a tenth aspect, a network device is provided. The network device includes a sending unit, configured to send first indication information to a first communication device, where the first indication information indicates a first resource, a second resource, and a third resource, the first resource is used for transmitting uplink information, the second resource is used for transmitting downlink information, and the third resource may be used for transmitting first information or not transmit information, where the first information includes at least one of uplink information, downlink information, or sidelink information, and the sending unit is further configured to send first control information to the first communication device, where the first control information indicates a sixth resource, the sixth resource belongs to a seventh resource, and the seventh resource includes at least one of the first resource, the second resource, the third resource, and a fourth resource, where the fourth resource is used for transmitting sidelink information, and the sending unit is further configured to send fifth indication information to the first communication device, where the fifth indication information indicates an eighth resource, the eighth resource belongs to the sixth resource, and the fourth resource in the eighth resource is used for transmitting sidelink information between the first communication device and a second communication device.

In a possible design, the sending unit is further configured to send fourth indication information to the first communication device, where the fourth indication information indicates a sidelink slot format indicator radio network temporary identifier, and the network device further includes a processing unit, where the processing unit scrambles, by using the sidelink slot format indicator radio network temporary identifier, at least one of the first indication information, the first control information, and the fifth indication information.

According to an eleventh aspect, a first communication device is provided. The first communication device includes a receiving unit, configured to receive first indication information from a network device, where the first indication information indicates a first resource, a second resource, and a third resource, the first resource is used for transmitting uplink information, the second resource is used for transmitting downlink information, and the third resource may be used for transmitting first information or not transmit information, where the first information includes at least one of uplink information, downlink information, or sidelink information, the receiving unit is further configured to receive first control information from the network device, where the first control information indicates a sixth resource, the sixth resource belongs to a seventh resource, and the seventh resource includes at least one of the first resource, the second resource, the third resource, and a fourth resource, where the fourth resource is used for transmitting sidelink information, the receiving unit is further configured to receive fifth indication information from the network device, where the fifth indication information indicates an eighth resource, the eighth resource belongs to the sixth resource, and the fourth resource in the eighth resource is used for transmitting sidelink information between the first communication device and a second communication device, and a sending unit, configured to send the sidelink information to the second communication device on the fourth resource in the eighth resource.

In a possible design, the receiving unit is further configured to receive fourth indication information from the network device, where the fourth indication information indicates a sidelink slot format indicator radio network temporary identifier, and the first communication device further includes a processing unit, where the processing unit is configured to descramble, by using the sidelink slot format indicator radio network temporary identifier, at least one of the first indication information, the first control information, and the fifth indication information.

In a possible design, the sidelink information includes at least one of sidelink control information or sidelink data, and the sending unit sends the sidelink data to the second communication device on the fourth resource in the eighth resource based on the sidelink control information.

In a possible design, the sidelink information further includes sidelink feedback information, where the sidelink feedback information indicates whether the second communication device correctly receives the sidelink data, and the receiving unit receives the sidelink feedback information from the second communication device on the fourth resource in the eighth resource.

According to a twelfth aspect, a second communication device is provided. The second communication device includes a receiving unit, configured to receive first indication information from a network device, where the first indication information indicates a first resource, a second resource, and a third resource, the first resource is used for transmitting uplink information, the second resource is used for transmitting downlink information, and the third resource may be used for transmitting first information or not transmit information, where the first information includes at least one of uplink information, downlink information, or sidelink information, the receiving unit is further configured to receive first control information from the network device, where the first control information indicates a sixth resource, the sixth resource belongs to a seventh resource, and the seventh resource includes at least one of the first resource, the second resource, the third resource, and a fourth resource, where the fourth resource is used for transmitting sidelink information, the receiving unit is further configured to receive fifth indication information from the network device, where the fifth indication information indicates an eighth resource, the eighth resource belongs to the sixth resource, and the fourth resource in the eighth resource is used for transmitting sidelink information between a first communication device and the second communication device, and the receiving unit is further configured to receive the sidelink information from the first communication device on the fourth resource in the eighth resource.

In a possible design, the receiving unit is further configured to receive fourth indication information from the network device, where the fourth indication information indicates a sidelink slot format indicator radio network temporary identifier, and the second communication device further includes a processing unit, where the processing unit is configured to descramble, by using the sidelink slot format indicator radio network temporary identifier, at least one of the first indication information, the first control information, and the fifth indication information.

In a possible design, the sidelink information includes at least one of sidelink control information or sidelink data, and the receiving unit receives the sidelink data from the first communication device on the fourth resource in the eighth resource based on the sidelink control information.

In a possible design, the sidelink information further includes sidelink feedback information, where the sidelink feedback information indicates whether the second communication device correctly receives the sidelink data, and the second communication device further includes a sending unit, where the sending unit is configured to send the sidelink feedback information to the first communication device on the fourth resource in the eighth resource.

According to a thirteenth aspect, an embodiment of this application provides a chip, configured to perform the methods according to the foregoing aspects. The chip may include a part having functions of a memory, a processor, a transmitter, a receiver, and/or a transceiver, and the memory stores an instruction, code, and/or data, to perform the methods according to the foregoing aspects.

According to a fourteenth aspect, an embodiment of this application provides a system. The system includes the network device, the first communication device, and the second communication device in the foregoing aspects.

DETAILED DESCRIPTION OF ILLUSTRATIVE EMBODIMENTS

Figure 1:
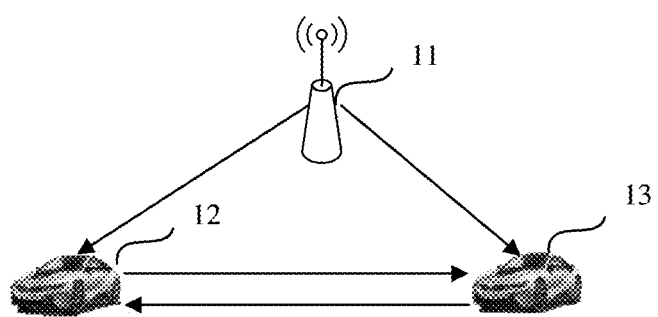
FIG. 1 is a schematic architectural diagram of a system according to an embodiment of this application.

FIG. 1 is a schematic architectural diagram of a possible V2X communications system according to an embodiment of the present invention. As shown in FIG. 1, an architecture of the V2X communications system includes transmission of sidelink information, and the communications system includes a network device 11, a first communication device 12, and a second communication device 13. The transmission of the sidelink information includes transmission of sidelink control information, sidelink data, or sidelink acknowledgement information between the first communication device 12 and the second communication device 13. The network device 11 configures, for the first communication device 12 and the second communication device 13, resources used for transmitting the sidelink information. The network device 11 sends indication information to the first communication device 12 and the second communication device 13, where the indication information may be radio resource control (RRC) signaling, the RRC signaling indicates a sidelink resource used for transmitting the sidelink information, and the first communication device 12 transmits the sidelink information to the second communication device 13 on the sidelink resource indicated by the indication information.

There may be one or more "second communication devices" in this application. If there are a plurality of second communication devices, the first communication device transmits the sidelink information to the plurality of second communication devices on the sidelink resources allocated by the network device 11. For ease of description, one communication device is used as an example for description in the present invention. However, a quantity of second communication devices included in the present invention includes but is not limited to this.

The network device in this application is an apparatus that is deployed in a radio access network and that is configured to provide a wireless communication function for the first communication device and the second communication device. The network device may be a base station (BS), for example, a macro base station, a micro base station, a relay station, an access point, or the like, or may be a device in another form, for example, a street lamp or a road side unit (RSU). In systems using different radio access technologies, a device having a network device function may be termed differently. For example, in a 5th generation 5G network, the device is a network device or a base station, in a long term evolution (LTE) network, the device is referred to as an evolved NodeB (eNB or eNodeB), in a 3rd generation (3G) network, the device is referred to as a NodeB or the like, or the device is an RSU in V2X communication, or a chip or a system-on-a-chip (SOC) in the network device or the base station. For ease of description, in this application, the foregoing apparatus that provides the wireless communication function for the first communication device and the second communication device is collectively referred to as the network device.

The first communication device and the second communication device in this application may include various devices having the wireless communication function or units, components, apparatuses, chips, or SOCs in the devices. The device having the wireless communication function may be, for example, a vehicle-mounted device, a wearable device, a computing device or another device connected to a wireless modem, a mobile station (MS), a terminal, or user equipment (UE).

With reference to specific examples, the following describes the embodiments of this application in more detail by using the first communication device, the second communication device, and the network device as examples.

Figure 2:
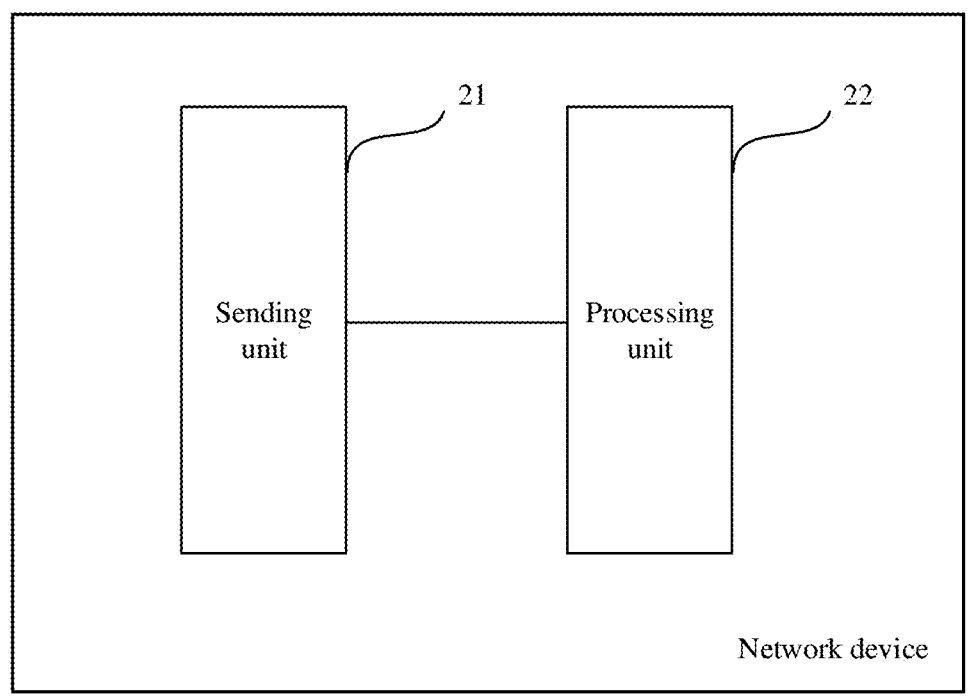
FIG. 2 shows a network device according to an embodiment of this application.
Figure 3:
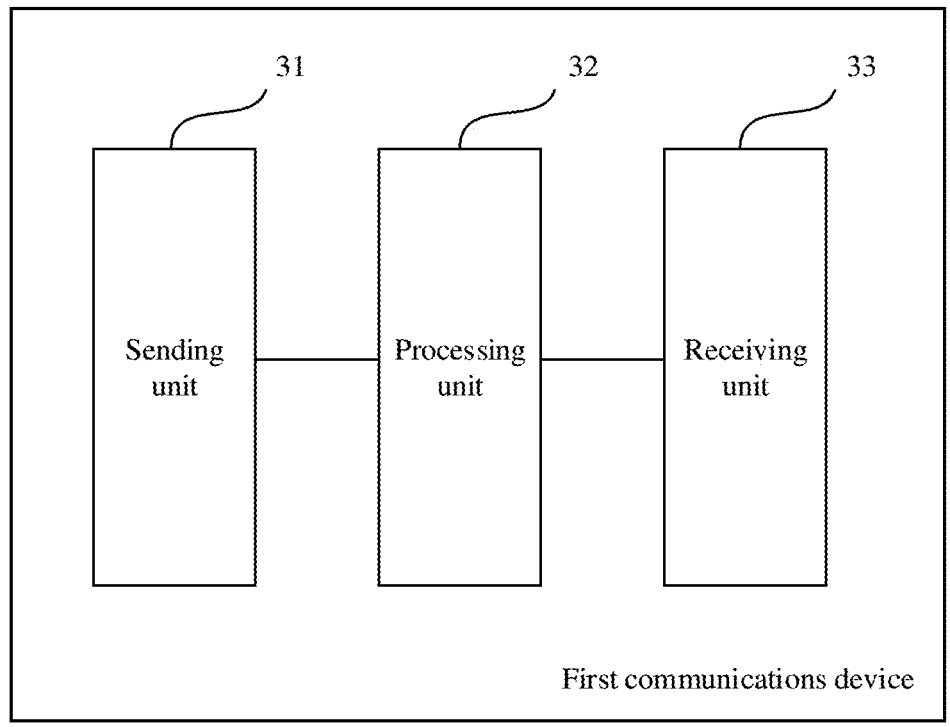
FIG. 3 shows a first communication device according to an embodiment of this application.
Figure 4:
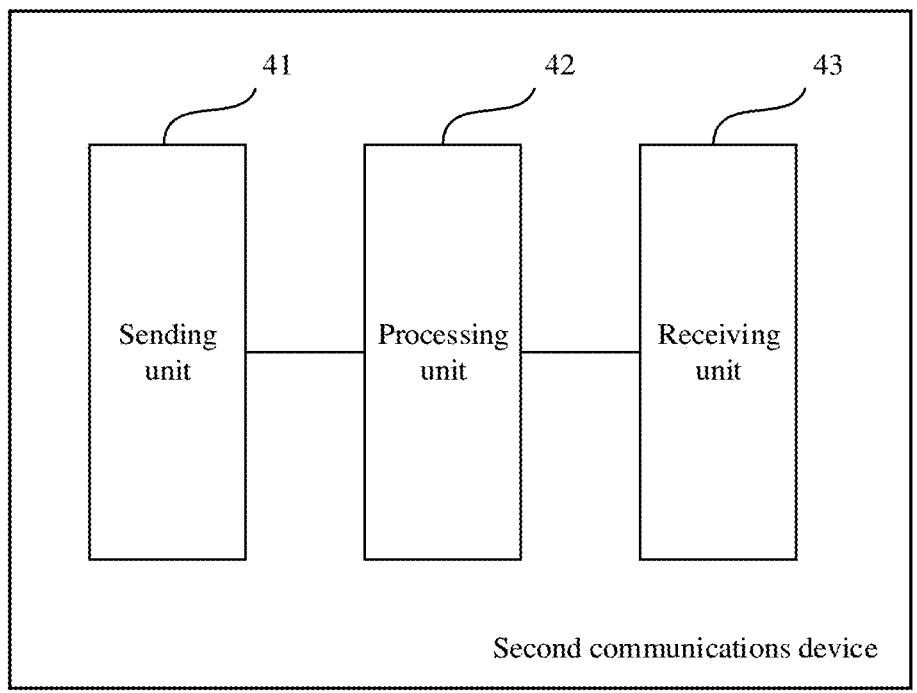
FIG. 4 shows a second communication device according to an embodiment of this application.
Figure 5:
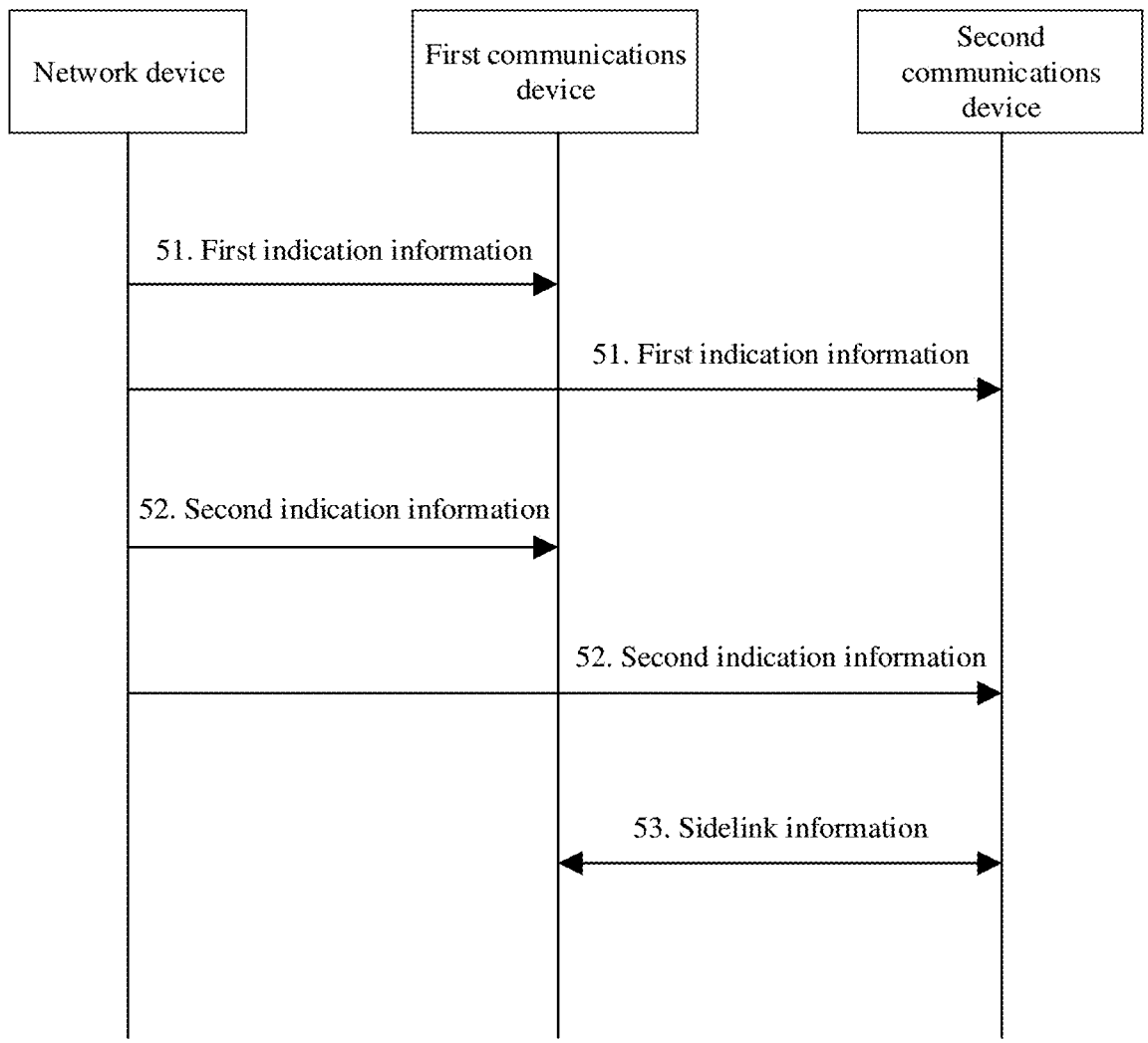
FIG. 5 shows a resource configuration method for sidelink information, a network device, a first communication device, a second communication device, and a system according to an embodiment of this application.

FIG. 5 shows a resource configuration method for sidelink information, a network device, a first communication device, a second communication device, and a system according to an embodiment of this application. As shown in FIG. 2, the network device includes a sending unit 21 and a processing unit 22, and may further include a receiving unit 23. The sending unit 21 and the receiving unit 23 may be replaced with a transceiver unit. As shown in FIG. 3, the first communication device includes a sending unit 31, a processing unit 32, and a receiving unit 33. The sending unit 31 and the receiving unit 33 may be replaced with a transceiver unit. As shown in FIG. 4, the second communication device includes a sending unit 41, a processing unit 42, and a receiving unit 43. The sending unit 41 and the receiving unit 43 may be replaced with a transceiver unit.

When the first communication device and the second communication device are terminal devices or user equipments, and when the network device is a base station, the processing unit 22 to the processing unit 42 may be processors, the sending unit 21 to the sending unit 41 and the receiving unit 23 to the receiving unit 43 may be transceivers, the sending unit 21 to the sending unit 41 may be transmitters, and the receiving unit 23 to the receiving unit 43 may be receivers. The transceivers, the transmitters, or the receivers may be radio frequency circuits. When the first communication device, the second communication device, or the network device includes a storage unit, the storage unit is configured to store a computer instruction. The processor is communicatively connected to the memory, and the processor executes the computer instruction stored in the memory, to enable the first communication device, the second communication device, or the network device to perform the method in the embodiment in FIG. 5. The processor may be a general-purpose central processing unit (CPU), a microprocessor, or an application-specific integrated circuit (ASIC).

When the first communication device, the second communication device, or the network device is a chip, the processing unit 22 to the processing unit 42 may be, for example, processors, the sending unit 21 to the sending unit 41 may be output interfaces, pins, circuits, or the like, the receiving unit 23 to the receiving unit 43 may be input interfaces, pins, circuits, or the like, and the transceiver units may be, for example, input/output interfaces, pins, or circuits. The processing unit may execute a computer-executable instruction stored in a storage unit, so that the first communication device, the second communication device, or the network device performs the method in FIG. 5. Optionally, the storage unit is a storage unit in the chip, for example, a register or a buffer, or the storage unit may be a storage unit in the terminal but outside the chip, for example, a read-only memory (ROM), another type of static storage device that can store static information and an instruction, or a random access memory (RAM).

Specific steps in the embodiment in FIG. 5 are as follows.

Step 51. The sending unit 21 of the network device sends first indication information to the first communication device, and the receiving unit 33 of the first communication device receives the first indication information from the network device, where the first indication information indicates a first resource, a second resource, and a third resource, the first resource is used for transmitting uplink information, the second resource is used for transmitting downlink information, and the third resource may be used for transmitting first information or not transmit information, where the first information includes at least one of uplink information, downlink information, or sidelink information. The third resource may be a flexible resource. The flexible resource is a resource that may be flexibly set by the network device or in a protocol for a specific purpose based on a service requirement or another factor. For example, when the first communication device needs to send the uplink information to the network device, the network device may configure the flexible resource as a resource used for transmitting the uplink information. A flexible resource is used as an example for description below. The sending unit of the network device may further send the first indication information to the second communication device. In this embodiment, the first communication device and the second communication device are used as examples. Actually, the sending unit of the network device may further send the first indication information to another communication device other than the first communication device and the second communication device. The first indication information may be RRC signaling, and the first indication information includes time division duplex sidelink configuration common (tdd-SL-configuration-Common) information. The network device configures, by using the tdd-SL-configuration-common information in the RRC signaling, an uplink resource, a downlink resource, and/or a flexible resource for a communication device in a serving cell corresponding to the network device, and the communication device in the serving cell obtains resource configuration information by using the received tdd-SL-configuration-common information. The resource configuration information includes at least one type of configuration information of a subframe configuration, a slot configuration, a mini-slot configuration, and a symbol configuration. A name of the information that is included in the RRC signaling and that implements a resource configuration function in the first indication information is not limited to the tdd-SL-configuration-common, and the name of the information included in the RRC signaling may alternatively be of another type.

Figure 6:
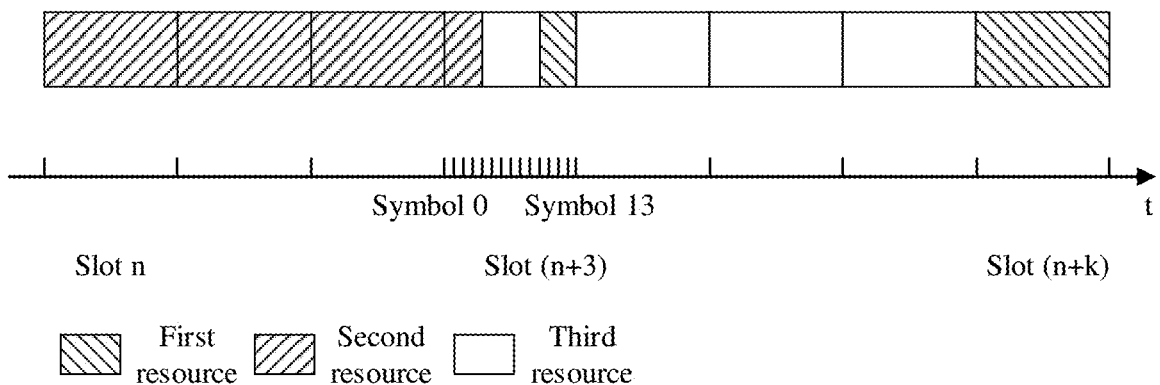
FIG. 6 is a schematic diagram of resource configuration according to an embodiment of this application.

The first resource to the third resource may be subframes, slots, mini-slots, or symbols. One slot includes 14 or 12 symbols. An example in which one slot includes 14 symbols is used for description below. For example, as shown in FIG. 6, resource configuration information that is of an $n^{th}$ slot to an $(n+k)^{th}$ slot and that is indicated by the first indication information sent by the network device to the first communication device and the second communication device is included in the figure. To be specific, the first indication information may indicate time resources in the slot n to the slot (n+k) that are used for transmitting the uplink information, time resources in the slot n to the slot (n+k) that are used for transmitting the downlink information, and resources that are used as third resources. The downlink information is transmitted in the slot n to a slot (n+2), the downlink information is transmitted in a symbol 0 to a symbol 3 in a slot (n+3), a symbol 4 to a symbol 9 are used as the third resources, the uplink information is transmitted in a symbol 10 to a symbol 13, a slot (n+4) to a slot (n+6) are the third resources, and the uplink information is transmitted in a slot (n+k).

Before step 51, the processing unit 22 of the network device may determine the first resource used for transmitting the uplink information, the second resource used for transmitting the downlink information, and the third resource used for transmitting the first information or not transmit information, where the first information includes at least one of the uplink information, the downlink information, and the sidelink information.

Step 52. The sending unit 21 of the network device sends second indication information to the first communication device, and the receiving unit 33 of the first communication device receives the second indication information from the network device, where the second indication information indicates a fourth resource, the fourth resource belongs to the first resource, the fourth resource belongs to the third resource, or the fourth resource belongs to the first resource and the third resource, the fourth resource is used for transmitting sidelink information between the first communication device and the second communication device. The second indication information may include at least one of slot location information, mini-slot location information, start symbol location information, a quantity of occupied symbols, a quantity of occupied mini-slots, and a quantity of occupied slots that are of the fourth resource. The sending unit 21 of the network device may further send the second indication information to the second communication device. In this embodiment, the first communication device and the second communication device are used as examples. Actually, the sending unit of the network device may further send the second indication information to another communication device other than the first communication device and the second communication device. The second indication information may be RRC signaling, and the second indication information includes time division duplex sidelink configuration dedicated (tdd-SL-configuration-dedicated) information. The network device configures, by using the tdd-SL-configuration-dedicated information in the RRC signaling, a resource used for sidelink transmission for a user-specific communication device, and the user-specific communication device obtains resource configuration information by using the received tdd-SL-configuration-dedicated information. The tdd-SL-configuration-dedicated information can only be used to further configure an uplink resource, a flexible resource, or an uplink resource and a flexible resource in a cell-specific configuration resource, and the resource configuration information includes at least one type of configuration information of a subframe configuration, a slot configuration, a mini-slot configuration, and a symbol configuration. A name of the information that is included in the RRC signaling and that implements a resource configuration function in the second indication information is not limited to the tdd-SL-configuration-dedicated, and the name of the information included in the RRC signaling may alternatively be of another type.

Figure 7:
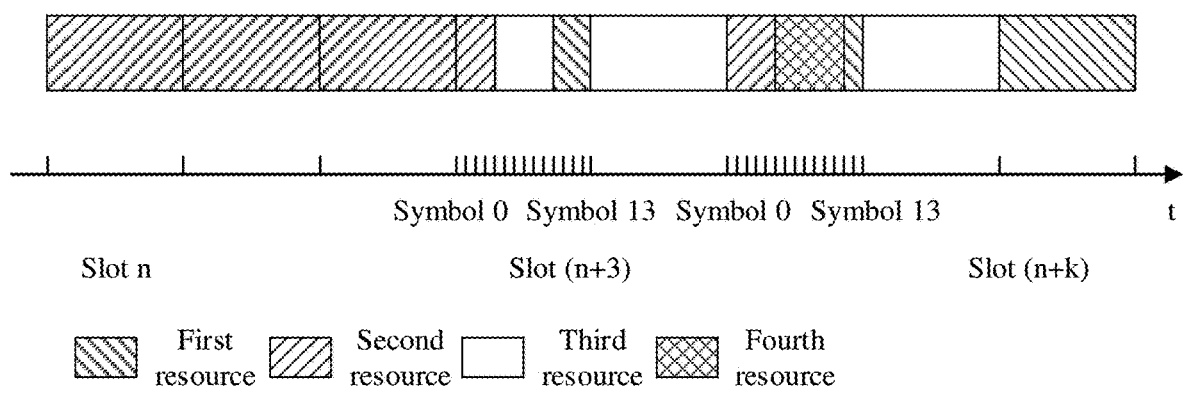
FIG. 7 is a schematic diagram of resource configuration according to an embodiment of this application.

The fourth resource may be a subframe, a slot, a mini-slot, or a symbol. As shown in FIG. 7, fourth resource configuration information that is of an $n^{th}$ slot to an $(n+k)^{th}$ slot and that is indicated by the second indication information sent by the network device to the first communication device and the second communication device is included in the figure. In other words, the second indication information may indicate time resources in the slot n to the slot (n+k) that are used for sidelink transmission. The slot location information included in the second indication information is (n+5), the start symbol location information is 5, and the quantity of occupied slots is 7. In this case, a symbol 5 to a symbol 11 in the slot (n+5) are configured to be used for sidelink transmission, the symbol 5 to the symbol 11 that are used for sidelink transmission belong to the fourth resource, and the fourth resource belongs to the third resource, that is, the slot (n+5).

The second indication information is further used to indicate a fifth resource, the fifth resource belongs to the third resource, the fifth resource is used for transmitting at least one of uplink information and downlink information, and the fifth resource may be a subframe, a slot, a mini-slot, or a symbol. The second indication information may further include time division duplex sidelink uplink/downlink configuration dedicated (tdd-SL-UL-DL-configuration-dedicated) information. After the network device configures for the communication devices in the serving cell by using the tdd-SL-configuration-common information, the network device may further reconfigure, by using the tdd-SL-UL- DL-configuration-dedicated information, uplink resources and downlink resources for some communication devices in the serving cell corresponding to the network device, and these communication devices obtain resource configuration information by using the received tdd-SL-UL-DL-configuration-dedicated information. The tdd-SL-UL-DL-configuration-dedicated information can only be used to further configure an uplink resource, a flexible resource, or an uplink resource and a flexible resource in a cell-specific configuration resource, and the resource configuration information includes at least one type of configuration information of a subframe configuration, a slot configuration, a mini-slot configuration, and a symbol configuration. A name of the information that is included in the RRC signaling and that implements a resource configuration function in the second indication information is not limited to the tdd-SL-UL-DL-configuration-dedicated, and the name of the information included in the RRC signaling may alternatively be of another type.

Before the network device sends the second indication information to the first communication device, the sending unit 21 of the network device may further send third indication information to the first communication device, and the receiving unit 33 of the first communication device receives the third indication information from the network device, where the third indication information indicates a fifth resource, the fifth resource belongs to the third resource, and the fifth resource is used for transmitting at least one of uplink information and downlink information. The third indication information may be RRC signaling, and the third indication information includes time division duplex sidelink uplink/downlink configuration dedicated (tdd-SL-UL-DL-configuration-dedicated) information. After the network device configures for the communication devices in the serving cell by using the tdd-SL-configuration-common information, the network device may further reconfigure, by using the tdd-SL-UL-DL-configuration-dedicated information, uplink resources and downlink resources for some communication devices in the serving cell corresponding to the network device, and these communication devices obtain resource configuration information by using the received tdd-SL-UL-DL-configuration-dedicated information. The tdd-SL-UL-DL-configuration-dedicated information can only be used to further configure an uplink resource, a flexible resource, or an uplink resource and a flexible resource in a cell-specific configuration resource, and the resource configuration information includes at least one type of configuration information of a subframe configuration, a slot configuration, a mini-slot configuration, and a symbol configuration. A name of the information that is included in the RRC signaling and that implements a resource configuration function in the third indication information is not limited to the tdd-SL-UL-DL-configuration-dedicated, and the name of the information included in the RRC signaling may alternatively be of another type.

As shown in FIG. 7, reconfiguration information of the $n^{th}$ slot to the $(n+k)^{th}$ slot by using the tdd-SL-UL-DL-configuration-dedicated information sent by the network device to the first communication device and the second communication device is included in the figure. In other words, the tdd-SL-UL-DL-configuration-dedicated information may indicate time resources that can be reconfigured for transmitting the uplink information and transmitting the downlink information in the slot n to the slot (n+k). A symbol 0 to a symbol 4 in the slot (n+5) are used for transmitting the downlink information, a symbol 12 and a symbol 13 are used for transmitting the uplink information, the symbol 0 to the symbol 4 and the symbol 12 and the symbol 13 belong to the fifth resource, and the fifth resource belongs to the third resource, that is, the slot (n+5).

Before step 52, the processing unit 22 of the network device determines the fourth resource used for sidelink transmission, where the fourth resource belongs to the first resource, the third resource, or the first resource and the third resource.

The sending unit 21 of the network device may further send fourth indication information to the first communication device, where the fourth indication information indicates a sidelink slot format indicator radio network temporary identifier (SL-SFI-RNTI), and the receiving unit 33 of the first communication device receives the fourth indication information. The processing unit 22 of the network device scrambles, by using the SL-SFI-RNTI, at least one of the first indication information to the third indication information, and then the network device sends scrambled indication information to the first communication device, and the processing unit 32 of the first communication device descrambles, by using the SL-SFI-RNTI, the scrambled indication information received from the network device, to obtain the at least one of the first indication information to the third indication information.

Step 53. The first communication device transmits the sidelink information to the second communication device on the fourth resource. The sending unit 31 of the first communication device sends the sidelink information to the second communication device on the fourth resource, and the receiving unit 43 of the second communication device receives the sidelink information from the first communication device on the fourth resource. The sidelink information may include at least one of sidelink control information (SCI) or sidelink data, and the first communication device sends the sidelink data to the second communication device on the fourth resource based on the sidelink control information. A first sidelink symbol of a resource for transmitting the sidelink information may be used for sending automatic gain control (AGC) information, and the SCI information is sent starting from a second sidelink symbol. The SCI information includes a quantity of symbols occupied by the SCI information and a quantity of symbols of the sidelink data, where a sidelink symbol after the symbols occupied by the SCI information is used for transmitting the sidelink data. Optionally, the first sidelink symbol of the resource for transmitting the sidelink information may be further used for sending the SCI information. The SCI information includes a quantity of symbols occupied by the SCI information and the quantity of symbols of the sidelink data, where the sidelink symbol after the symbols occupied by the SCI information is used for transmitting the sidelink data. The receiving unit 43 of the second communication device receives the sidelink data from the first communication device on the fourth resource based on the sidelink control information. For example, the second communication device receives the sidelink information in a slot occupied by the uplink resource and a slot occupied by the flexible resource, determines, at a location of a second or a third uplink symbol or a symbol occupied by the flexible resource, whether the sidelink information is the SCI, and obtains the sidelink data based on the SCI after correctly receiving the SCI.

In addition to the sidelink control information and the sidelink data, the sidelink information may further include sidelink feedback information. Certainly, the sidelink information may include only sidelink feedback information, where the sidelink feedback information indicates whether the second communication device correctly or successfully receives the sidelink data. In this case, the SCI further includes indication information of the sidelink feedback information, and the sidelink feedback information may include acknowledgement (ACK) information, negative acknowledgement (NACK) information, channel state information (CSI), and the like. The sending unit 41 of the second communication device sends the sidelink feedback information to the first communication device on the fourth resource, and the receiving unit 33 of the first communication device receives the sidelink feedback information from the second communication device on the fourth resource. The ACK/NACK acknowledgement information is used as an example. The feedback information may be i-bit indication information. When the i-bit indication information is 0, it indicates the NACK. In other words, the second communication device does not correctly receive the sidelink data. Therefore, the first communication device needs to resend the sidelink information to the second communication device. When the i-bit indication information is 1, it indicates the ACK. In other words, the second communication device correctly receives the sidelink data.

The sending unit 21 of the network device sends first indication information to the first communication device, and the receiving unit 33 of the first communication device receives the first indication information from the network device, where the first indication information indicates a first resource, a second resource, and a third resource, the first resource is used for transmitting uplink information, the second resource is used for transmitting downlink information, and the third resource may be used for transmitting first information or not transmit information, where the first information includes at least one of uplink information, downlink information, or sidelink information, the sending unit 21 of the network device sends first control information to the first communication device, and the receiving unit 33 of the first communication device receives the first control information from the network device, where the first control information indicates a sixth resource, the sixth resource belongs to a seventh resource, and the seventh resource includes at least one of the first resource, the second resource, the third resource, and a fourth resource, where the fourth resource is used for transmitting sidelink information, and the sending unit 21 of the network device sends fifth indication information to the first communication device, and the receiving unit 33 of the first communication device receives the fifth indication information from the network device, where the fifth indication information indicates an eighth resource, the eighth resource belongs to the sixth resource, and the fourth resource in the eighth resource is used for transmitting sidelink information between the first communication device and the second communication device.

The seventh resource may be a possible resource for each symbol in a subframe, a slot, and/or a mini-slot that is indicated by a predefined configuration of a downlink resource, an uplink resource, a sidelink resource, and/or a flexible resource. A configuration of a downlink resource, an uplink resource, a sidelink resource and/or a flexible resource that is included in one slot is used as an example below for description. The configuration is that different symbols in one slot are used for configuration of an uplink resource, a downlink resource, a sidelink resource, a flexible resource, or the like, as shown in Table 1 and Table 2. In Table 1 and Table 2, an uplink resource is indicated by U, a downlink resource is indicated by D, a sidelink resource is indicated by S, and a flexible resource is indicated by X. Table 1 and Table 2 may be dynamically or semi-statically indicated by the network device to the communication device by using indication information, or may be directly predefined in a communications protocol. A specific configuration of a downlink resource, an uplink resource, a sidelink resource and/or a flexible resource included in a slot and a corresponding sequence number are included in Table 1 and Table 2.

The first control information may be downlink control information (DCI), and the first control information may include sidelink-slot-format-indicator (SL-slot-Format-Indicator) information, where the SL-slot-format-indicator information includes m n-bits, and both m and n are positive integers greater than or equal to 1. An n-bit value corresponds to the predefined configuration of a downlink resource, an uplink resource, a sidelink resource, and/or a flexible resource that are/is in the seventh resource. The seventh resource may be a configuration of a downlink resource, an uplink resource, a sidelink resource, and/or a flexible resource that are/is included in one slot in Table 1. In this case, n is equal to 8. To be specific, 256 sets of resource configuration information of different symbols in one slot is defined in Table 1. Each set of configuration information corresponds to one value of 8-bit indication information, where a configuration on a symbol usage of 49 to 255 can be defined based on that of 0 to 48. Table 1 provides only a possible configuration on usages of symbols in a slot. This is not limited in an actual application.

TABLE 1

| n-bit value | Usage of each symbol in a slot | | | | | | | | | | | | | |
|---|---|---|---|---|---|---|---|---|---|---|---|---|---|---|
| 0  | S | S | S | S | S | S | S | S | S | S | S | S | S | S |
| 1  | D | D | D | D | D | D | D | D | D | D | X | S | S | S |
| 2  | D | D | D | D | D | D | D | D | D | X | S | S | S | S |
| 3  | D | D | D | D | D | D | D | D | X | S | S | S | S | S |
| 4  | D | D | D | D | D | D | D | X | S | S | S | S | S | S |
| 5  | D | D | D | D | D | D | X | S | S | S | S | S | S | S |
| 6  | D | D | D | D | D | X | S | S | S | S | S | S | S | S |
| 7  | D | D | D | D | X | S | S | S | S | S | S | S | S | S |
| 8  | D | D | D | X | S | S | S | S | S | S | S | S | S | S |
| 9  | D | D | X | S | S | S | S | S | S | S | S | S | S | S |
| 10 | D | X | S | S | S | S | S | S | S | S | S | S | S | S |
| 11 | D | X | S | S | S | S | S | S | S | S | S | S | X | U |
| 12 | D | D | X | S | S | S | S | S | S | S | S | S | X | U |
| 13 | D | D | D | X | S | S | S | S | S | S | S | S | X | U |
| 14 | D | D | D | D | X | S | S | S | S | S | S | S | X | U |
| 15 | D | D | D | D | D | X | S | S | S | S | S | S | X | U |
| 16 | D | D | D | D | D | D | X | S | S | S | S | S | X | U |
| 17 | D | D | D | D | D | D | D | X | S | S | S | S | X | U |
| 18 | D | D | D | D | D | D | D | D | X | S | S | S | X | U |
| 19 | D | X | S | S | S | S | S | S | S | S | S | X | U | U |
| 20 | D | D | X | S | S | S | S | S | S | S | S | X | U | U |
| 21 | D | D | D | X | S | S | S | S | S | S | S | X | U | U |
| 22 | D | D | D | D | X | S | S | S | S | S | S | X | U | U |
| 23 | D | D | D | D | D | X | S | S | S | S | S | X | U | U |
| 24 | D | D | D | D | D | D | X | S | S | S | S | X | U | U |
| 25 | D | D | D | D | D | D | D | X | S | S | S | X | U | U |
| 26 | D | X | S | S | S | S | S | S | S | S | X | U | U | U |
| 27 | D | D | X | S | S | S | S | S | S | S | X | U | U | U |
| 28 | D | D | D | X | S | S | S | S | S | S | X | U | U | U |
| 29 | D | D | D | D | X | S | S | S | S | S | X | U | U | U |
| 30 | D | D | D | D | D | X | S | S | S | S | X | U | U | U |
| 31 | D | D | D | D | D | D | X | S | S | S | X | U | U | U |
| 32 | D | X | S | S | S | S | S | S | S | X | U | U | U | U |
| 33 | D | D | X | S | S | S | S | S | S | X | U | U | U | U |
| 34 | D | D | D | X | S | S | S | S | S | X | U | U | U | U |
| 35 | D | D | D | D | X | S | S | S | S | X | U | U | U | U |
| 36 | D | D | D | D | D | X | S | S | S | X | U | U | U | U |
| 37 | D | X | S | S | S | S | S | S | X | U | U | U | U | U |
| 38 | D | D | X | S | S | S | S | S | X | U | U | U | U | U |

TABLE 1-continued

| n-bit value | Usage of each symbol in a slot | | | | | | | | | | | | | |
|---|---|---|---|---|---|---|---|---|---|---|---|---|---|---|
| 39 | D | D | D | X | S | S | S | S | X | U | U | U | U | U |
| 40 | D | D | D | D | X | S | S | S | X | U | U | U | U | U |
| 41 | D | X | S | S | S | S | S | X | U | U | U | U | U | U |
| 42 | D | D | X | S | S | S | S | X | U | U | U | U | U | U |
| 43 | D | D | D | X | S | S | S | S | X | U | U | U | U | U |
| 44 | D | X | S | S | S | S | X | U | U | U | U | U | U | U |
| 45 | D | D | X | S | S | S | X | U | U | U | U | U | U | U |
| 46 | D | X | S | S | S | X | U | U | U | U | U | U | U | U |
| 47 | D | D | X | S | S | S | S | D | D | X | S | S | S | S |
| 48 | D | D | D | X | S | S | S | S | D | D | X | S | S | S |
| 49-255 | Reserved | | | | | | | | | | | | | |

The first control information may further include slot-format-indicator information, where the slot-format-indicator information includes m n-bits, and both m and n are positive integers greater than or equal to 1. An n-bit value corresponds to the predefined configuration of a downlink resource, an uplink resource, a sidelink resource, and/or a flexible resource that are/is in the seventh resource. The seventh resource may be a configuration of a downlink resource, an uplink resource, a sidelink resource, and/or a flexible resource that are/is included in one slot in Table 2. In this case, n is equal to 8. To be specific, 256 sets of resource configuration information of different symbols in one slot is defined in Table 2. Each set of configuration information corresponds to one value of 8-bit indication information, where a configuration on a symbol usage of 105 to 255 can be defined based on that of 0 to 104. Table 2 provides only a possible configuration on usages of symbols in a slot. This is not limited in an actual application.

TABLE 2

| n-bit value | Usage of each symbol in a slot | | | | | | | | | | | | | |
|---|---|---|---|---|---|---|---|---|---|---|---|---|---|---|
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | X | X | X | X | X | X | X | U | U |
| 45 | D | D | D | D | D | X | X | U | U | U | U | U | U | U |
| 46 | D | D | D | D | D | X | D | D | D | D | D | X | D | U |
| 47 | D | D | X | U | U | U | U | D | X | U | U | U | U | U |
| 48 | D | X | U | U | U | U | U | D | X | U | U | U | U | U |
| 49 | D | D | D | X | X | U | D | D | D | X | X | U | U | U |
| 50 | D | D | X | X | U | U | D | D | X | X | U | U | U | U |
| 51 | D | X | X | U | U | U | D | X | X | U | U | U | U | U |
| 52 | D | X | X | X | X | U | D | X | X | X | X | U | U | U |
| 53 | D | D | X | X | X | U | D | D | X | X | X | U | U | U |
| 54 | X | X | X | X | X | X | D | D | D | D | D | D | D | D |
| 55 | D | D | X | X | U | U | U | D | D | D | D | D | D | D |
| 56 | S | S | S | S | S | S | S | S | S | S | S | S | S | S |
| 57 | D | D | D | D | D | D | D | D | D | X | S | S | S | S |
| 58 | D | D | D | D | D | D | D | D | X | S | S | S | S | S |
| 59 | D | D | D | D | D | D | D | X | S | S | S | S | S | S |
| 60 | D | D | D | D | D | D | X | S | S | S | S | S | S | S |
| 61 | D | D | D | D | D | X | S | S | S | S | S | S | S | S |
| 62 | D | D | D | D | X | S | S | S | S | S | S | S | S | S |
| 63 | D | D | D | X | S | S | S | S | S | S | S | S | S | S |
| 64 | D | D | X | S | S | S | S | S | S | S | S | S | S | S |
| 65 | D | X | S | S | S | S | S | S | S | S | S | S | S | S |
| 66 | D | X | S | S | S | S | S | S | S | S | S | S | S | S |
| 67 | D | X | S | S | S | S | S | S | S | S | S | S | X | U |
| 68 | D | X | S | S | S | S | S | S | S | S | S | S | X | U |
| 69 | D | D | X | S | S | S | S | S | S | S | S | S | X | U |
| 70 | D | D | D | X | S | S | S | S | S | S | S | S | X | U |
| 71 | D | D | D | D | X | S | S | S | S | S | S | S | X | U |
| 72 | D | D | D | D | D | X | S | S | S | S | S | S | X | U |
| 73 | D | D | D | D | D | D | X | S | S | S | S | S | X | U |
| 74 | D | D | D | D | D | D | D | X | S | S | S | S | X | U |
| 75 | D | X | S | S | S | S | S | S | S | S | S | X | U | U |
| 76 | D | X | S | S | S | S | S | S | S | S | X | X | U | U |
| 77 | D | D | X | S | S | S | S | S | S | S | S | X | U | U |
| 78 | D | D | D | X | S | S | S | S | S | S | S | X | U | U |
| 79 | D | D | D | D | X | S | S | S | S | S | S | X | U | U |
| 80 | D | D | D | D | D | X | S | S | S | S | S | X | U | U |
| 81 | D | D | D | D | D | D | X | S | S | S | S | X | U | U |
| 82 | D | X | S | S | S | S | S | S | S | X | U | U | U | U |
| 83 | D | D | X | S | S | S | S | S | S | X | U | U | U | U |
| 84 | D | D | X | S | S | S | S | S | S | X | U | U | U | U |
| 85 | D | D | D | X | S | S | S | S | S | X | U | U | U | U |
| 86 | D | D | D | D | X | S | S | S | X | U | U | U | U | U |
| 87 | D | D | D | D | D | X | S | S | X | U | U | U | U | U |
| 88 | D | X | S | S | S | S | S | X | U | U | U | U | U | U |
| 89 | D | X | S | S | S | S | S | X | U | U | U | U | U | U |
| 90 | D | D | X | S | S | S | S | X | U | U | U | U | U | U |
| 91 | D | D | D | X | S | S | S | X | U | U | U | U | U | U |
| 92 | D | D | D | D | X | S | S | X | U | U | U | U | U | U |
| 93 | D | X | S | S | S | S | X | U | U | U | U | U | U | U |
| 94 | D | X | S | S | S | S | X | U | U | U | U | U | U | U |
| 95 | D | D | X | S | S | S | X | U | U | U | U | U | U | U |
| 96 | D | D | D | X | S | S | X | U | U | U | U | U | U | U |
| 97 | D | X | S | S | S | X | U | U | U | U | U | U | U | U |
| 98 | D | D | X | S | S | X | U | U | U | U | U | U | U | U |
| 99 | D | D | X | S | S | X | U | U | U | U | U | U | U | U |
| 100 | D | X | S | S | S | X | U | U | U | U | U | U | U | U |
| 101 | D | X | S | S | S | X | U | U | U | U | U | U | U | U |
| 102 | D | X | S | S | X | U | U | U | U | U | U | U | U | U |
| 103 | D | X | S | S | S | S | D | D | X | S | S | S | S | S |
| 104 | D | D | X | S | S | S | D | D | D | X | S | S | S | S |
| 105-255 | Reserved | | | | | | | | | | | | | |

The fifth indication information may be RRC signaling, and the fifth indication information may include position-indicator (position-indicator) information, where the position-indicator information indicates a specific n-bit value in the SL-slot-format-indicator information and/or the slot-format-indicator information. For example, in Table 1, when the SL-slot-format-indicator information is 0000 0011 0000 0110 0000 1001, the SL-slot-format-indicator information includes three 8-bit values that separately indicate corresponding configuration information of a third type, a sixth type, and a ninth type of symbols in Table 1, that is, the sixth resource. The position-indicator information may indicate an initial position of an 8-bit value, that is, a specific 8-bit value of the three 8-bit values in the SL-slot-format-indicator information is selected. For example, when the position-indicator information indicates a first position, the first communication device selects a first 8-bit value in the SL-slot-format-indicator information, that is, configuration information of the third type of symbols in Table 1, where the configuration information of the third type of symbols is the eighth resource.

The sending unit 21 of the network device may further send fourth indication information to the first communication device, where the fourth indication information indicates a sidelink slot format indicator radio network tempoary identifier (Sidelink Slot Format Indicator Radio Network Temporary Identifier, SL-SFI-RNTI), and the receiving unit 33 of the first communication device receives the fourth indication information. The processing unit 22 of the network device scrambles, by using the SL-SFI-RNTI, at least one of the first indication information, the first control information and the fifth indication information, and the processing unit 32 of the first communication device descrambles, by using the SL-SFI-RNTI, scrambled information received from the network device, to obtain the at least one of the first indication information, the first control information, and the fifth indication information.

The first communication device transmits the sidelink information to the second communication device on the fourth resource in the eighth resource. The sending unit 31 of the first communication device sends the sidelink information to the second communication device on the fourth resource in the eighth resource, and the receiving unit 43 of the second communication device receives the sidelink information from the first communication device on the fourth resource in the eighth resource. The sidelink information may include at least one of sidelink control information (SCI) or sidelink data, and the first communication device sends the sidelink data to the second communication device on the fourth resource based on the sidelink control information. A first sidelink symbol of a resource for transmitting the sidelink information may be used for sending automatic gain control (AGC) information, and the SCI information is sent starting from a second sidelink symbol. The SCI information includes a quantity of symbols occupied by the SCI information and a quantity of symbols of the sidelink data, where a sidelink symbol after the symbols occupied by the SCI information is used for transmitting the sidelink data. The receiving unit 43 of the second communication device receives the sidelink data from the first communication device on the fourth resource in the eighth resource based on the sidelink control information. For example, the second communication device receives the sidelink information in a slot occupied by the uplink resource and a slot occupied by the flexible resource, determines, at a location of a second or a third uplink symbol or a symbol occupied by the flexible resource, whether the sidelink information is the SCI, and obtains the sidelink data based on the SCI after correctly receiving the SCI.

In addition to the sidelink control information and the sidelink data, the sidelink information may further include sidelink feedback information. Certainly, the sidelink information may include only sidelink feedback information, where the sidelink feedback information indicates whether the second communication device correctly or successfully receives the sidelink data. In this case, the SCI further includes indication information of the sidelink feedback information, and the feedback may include acknowledgement (ACK) information, negative acknowledgement (NACK) information, channel state information (CSI), and the like. The sending unit 41 of the second communication device sends the sidelink feedback information to the first communication device on the fourth resource in the eighth resource, and the receiving unit 33 of the first communication device receives the sidelink feedback information from the second communication device on the fourth resource in the eighth resource. The ACK/NACK acknowledgement information is used as an example. The feedback information may be i-bit indication information. When the i-bit indication information is 0, it indicates the NACK. In other words, the second communication device does not correctly receive the sidelink data. Therefore, the first communication device needs to resend the sidelink information to the second communication device. When the i-bit indication information is 1, it indicates the ACK. In other words, the second communication device correctly receives the sidelink data.

What is claimed is:

1. A resource configuration method for sidelink information performed by a first communication device or a chip in the first communication device, comprising:

receiving first indication information from a network device, wherein the first indication information indicates slots and symbols of a first resource, a second resource, and a third resource, wherein the first resource is used for transmitting uplink information, wherein the second resource is used for transmitting downlink information, and wherein the third resource is a flexible resource and is used for transmitting first information or not transmitting information, and wherein the first information comprises at least one of uplink information, downlink information, or sidelink information;

receiving second indication information from the network device, wherein the second indication information indicates location information of slots of a fourth resource, and indicates start symbol location information within the slots of the fourth resource and a quantity of occupied symbols within the slots of the fourth resource, wherein the fourth resource belongs to the first resource, and wherein the fourth resource is used for transmitting sidelink information between the first communication device or the chip in the first communication device and a second communication device; and sending the sidelink information to the second communication device on the fourth resource, wherein the sidelink information comprises sidelink feedback information, sidelink control information and sidelink data.

2. The method according to claim 1, wherein the second indication information is information regarding the fourth resource and comprises at least one of mini-slot location information, a quantity of occupied mini-slots, or a quantity of occupied slots.

3. The method according to claim 1, wherein the sidelink feedback information indicates whether the second communication device correctly or successfully receives the sidelink data.

4. The method according to claim 1, wherein a first sidelink symbol of the fourth resource is used for sending automatic gain control (AGC) information, and wherein a second sidelink symbol of the fourth resource is used for sending the sidelink control information.

5. The method according to claim 1, wherein the sidelink feedback information comprises 1-bit indication information, and wherein the 1-bit indication information indicates acknowledgement (ACK) information or negative acknowledgement (NACK) information.

6. A resource configuration method for sidelink information performed by a second communication device or a chip in the second communication device, comprising:
receiving first indication information from a network device, wherein the first indication information indicates slots and symbols of a first resource, a second resource, and a third resource, wherein the first resource is used for transmitting uplink information, wherein the second resource is used for transmitting downlink information, and wherein the third resource is a flexible resource and is used for transmitting first information or not transmitting information, and wherein the first information comprises at least one of uplink information, downlink information, or sidelink information;
receiving the second indication information from the network device, wherein the second indication information indicates location information of slots of a fourth resource, and indicates start symbol location information within the slots of the fourth resource and a quantity of occupied symbols within the slots of the fourth resource, wherein the fourth resource belongs to the first resource, and wherein the fourth resource is used for transmitting sidelink information between the second communication device or the chip in the first communication device and a first communication device; and
receiving the sidelink information from the first communication device on the fourth resource, wherein the sidelink information comprises sidelink feedback information, sidelink control information and sidelink data.

7. The method according to claim 6, wherein the second indication information is information regarding the fourth resource and comprises at least one of mini-slot location information, a quantity of occupied mini-slots, or a quantity of occupied slots.

8. A wireless apparatus, comprising:
one or more processors; and
a non-transitory computer readable memory storing a computer program for execution by the one or more processors, the computer program including instructions for:
receiving first indication information from a network device, wherein the first indication information indicates slots and symbols of a first resource, a second resource, and a third resource, wherein the first resource is used for transmitting uplink information, wherein the second resource is used for transmitting downlink information, and wherein the third resource is a flexible resource and is used for transmitting first information or not transmitting information, and wherein the first information comprises at least one of uplink information, downlink information, or sidelink information; and
receiving second indication information from the network device, wherein the second indication information indicates location information of slots of a fourth resource, and indicates start symbol location information within the slots of the fourth resource and a quantity of occupied symbols within the slots of the fourth resource, wherein the fourth resource belongs to the first resource, and wherein the fourth resource is used for transmitting sidelink information between the wireless apparatus and a second communication device; and
sending the sidelink information to the second communication device on the fourth resource, wherein the sidelink information comprises sidelink feedback information, sidelink control information and sidelink data.

9. The wireless apparatus according to claim 8, wherein the second indication information is information regarding the fourth resource and comprises at least one of mini-slot location information, a quantity of occupied mini-slots, or a quantity of occupied slots.

10. The wireless apparatus according to claim 8, wherein the sidelink feedback information indicates whether the second communication device correctly or successfully receives the sidelink data.

11. The wireless apparatus according to claim 8, wherein a first sidelink symbol of the fourth resource is used for sending automatic gain control (AGC) information, and wherein a second sidelink symbol of the fourth resource is used for sending the sidelink control information.

12. The wireless apparatus according to claim 8, wherein the sidelink feedback information comprises 1-bit indication information, and wherein the 1-bit indication information indicates acknowledgement (ACK) information or negative acknowledgement (NACK) information.

13. A wireless apparatus, comprising:
one or more processors; and
a non-transitory computer readable memory, storing a computer program for execution by the one or more processors, the computer program including instructions for:
receiving first indication information from a network device, wherein the first indication information indicates slots and symbols of a first resource, a second resource, and a third resource, wherein the first resource is used for transmitting uplink information, wherein the second resource is used for transmitting downlink information, and wherein the third resource is a flexible resource and is used for transmitting first information or not transmitting information, and wherein the first information comprises at least one of uplink information, downlink information, or sidelink information;
receiving second indication information from the network device, wherein the second indication information indicates location information of slots of a fourth resource, and indicates start symbol location information within the slots of the fourth resource and a quantity of occupied symbols within the slots of the fourth resource, wherein the fourth resource belongs to the first resource, and wherein the fourth resource is used for transmitting sidelink information between the wireless apparatus and a first communication device; and
receiving the sidelink information from the first communication device on the fourth resource, wherein the sidelink information comprises sidelink feedback information, sidelink control information and sidelink data.

14. The wireless apparatus according to claim 13, wherein the second indication information is information regarding the fourth resource and comprises at least one of mini-slot location information, a quantity of occupied mini-slots, or a quantity of occupied slots.

* * * * *

UNITED STATES PATENT AND TRADEMARK OFFICE
CERTIFICATE OF CORRECTION

PATENT NO. : 12,426,010 B2  
APPLICATION NO. : 17/168748  
DATED : September 23, 2025  
INVENTOR(S) : Su et al.

Page 1 of 1

It is certified that error appears in the above-identified patent and that said Letters Patent is hereby corrected as shown below:

In the Specification

In Column 19, Line 15, delete "i-bit" and insert -- 1-bit --.

In Column 19, Line 16, delete "i-bit" and insert -- 1-bit --.

In Column 19, Line 21, delete "i-bit" and insert -- 1-bit --.

In Column 24, Line 20, after "may be" delete "i-bit" and insert -- 1-bit --.

In Column 24, Line 20, after "the" delete "i-bit" and insert -- 1-bit --.

In Column 24, Line 25, delete "i-bit" and insert -- 1-bit --.

In the Claims

In Column 25, in Claim 6, Line 30, after "receiving" delete "the".

In Column 25, in Claim 6, Line 39, delete "first" and insert -- second --.

Signed and Sealed this  
Twenty-eighth Day of October, 2025

John A. Squires  
*Director of the United States Patent and Trademark Office*